Patented Feb. 26, 1946

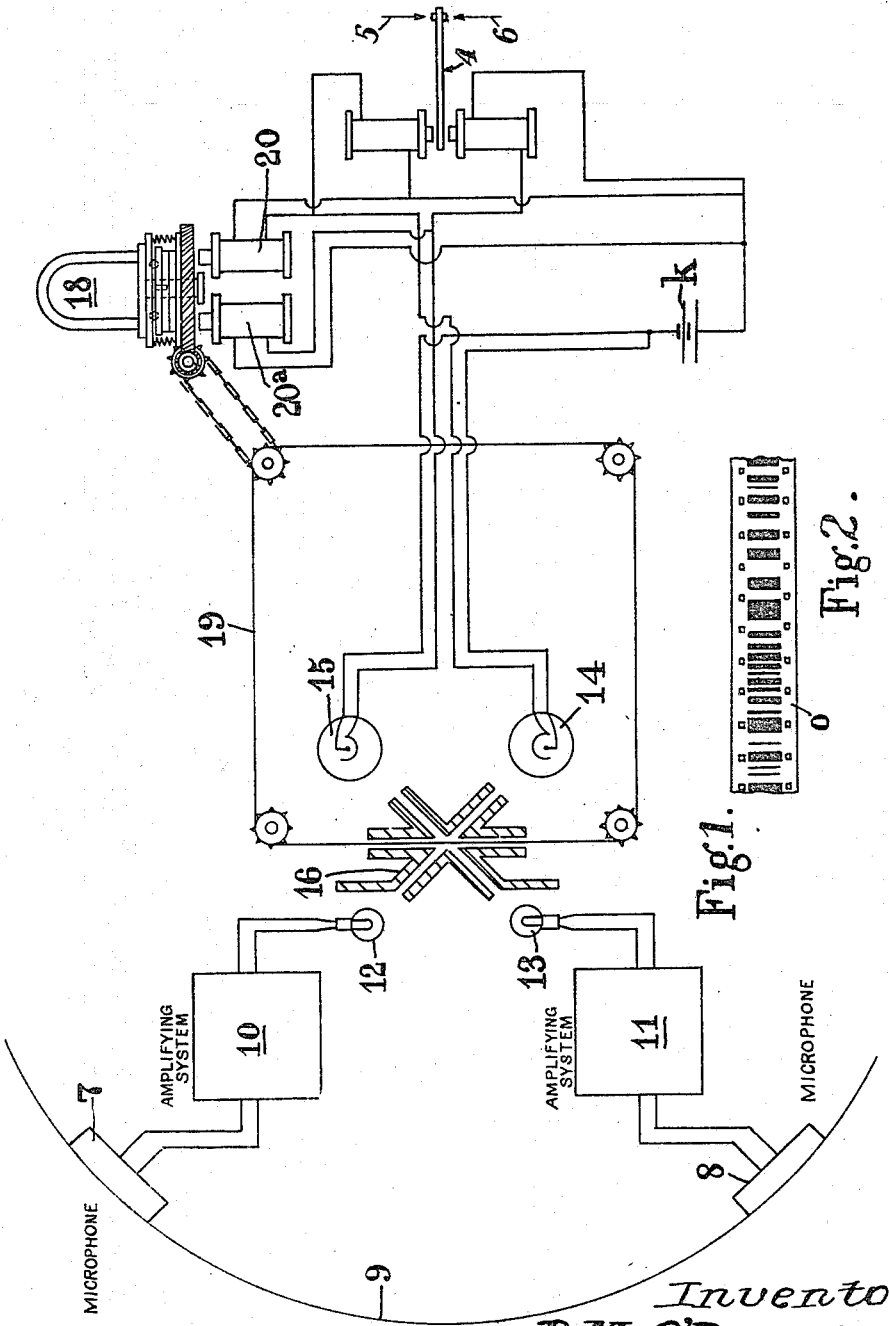

2,395,422

UNITED STATES PATENT OFFICE 2,395,422

TORPEDO DEFENSE AND THE LIKE

Daniel Michael O'Dwyer, London, England

Application January 11, 1943, Serial No. 472,046
In Great Britain December 30, 1941

2 Claims. (Cl. 114—23)

This invention relates to torpedo defense and the like, that is to say, to the defense of battleships or craft or stationary objects against attacks by hostile torpedoes, by submarines or by other craft.

Referring to the accompanying diagrammatic drawing:

Figure 1 illustrates an arrangement according to one form of the present invention employing two microphones, and Figure 2 is a diagrammatic view of a film track.

In carrying the invention into effect in one form by way of example in general terms, a defense torpedo is constructed with two or more sound receiving devices which may pick up sounds of a wide range provided they within that range are capable of accepting sounds made by the passage of a particular selected oncoming torpedo through the water. The known sounds thus picked up are caused by any suitable mechanism to produce light waves or waves or impulses or to modify the action of a source or sources of illumination. The light passes through a light gate similar to the sound track on a preformed cinematograph talking film, the sound to which the track corresponds being that of the passage of the selected torpedo through the water. This track is driven at an appropriate speed which may be variable. When the speed is such that the sound of the oncoming hostile torpedo corresponds to the representation on the sound track, the light modified by the sound of the oncoming hostile torpedo is able to pass through what is in effect a trap formed by the sound track and at this stage the speed is preferably automatically maintained. The light passing through this trap or gate falls on to a selenium cell or the like and thus modifies a local circuit which operates the rudder or other steering device of the torpedo.

A constructional arrangement on the above lines is illustrated in Figures 1 and 2 wherein two microphones 7, 8 are fixed at an angle to the longitudinal axis in the nose 9 of a torpedo. The microphones are connected to amplifying systems 10, 11 which control respectively light emitted by neon lamps 12, 13; the microphones are of any suitable kind, e. g., carbon microphones.

Each microphone is in electrical circuit with a separate battery and this circuit includes the primary of a step up transformer (not shown) of such a nature that the secondary circuit has a sufficiently high voltage to operate the neon lamps. The lamps need not necessarily contain neon gas, any gas suitable for the purpose of the invention could be used. The electrical variations in the primary circuit of the transformer cause corresponding variations in the luminosity of the neon lamps. If necessary the light in the neon lamps may be increased by employing valves and accessory batteries.

The light from each of the neon lamps is concentrated on the film by a condenser and objective lens (not shown). The condenser lens are adjacent to the respective lamps and the objective lens adjacent to the film. Between each pair of lens a narrow slit is placed. The light from the lamp is made to converge on the slits by the condensers and the diverging rays passing through the slit are collected by the objective lens and concentrated on the film so that images of the slits are formed on the film.

Light sensitive cells 14 and 15 are provided, passage of light from the light sources to the cells taking place by way of a gate 16. Selenium cells may be substituted for photocells since the function of the photo cells is not to reproduce minute electrical variations but to register certain gross changes in the amount of light passing through the film. The photo-sensitive cells are in an electrical circuit associated with one which operates a pair of solenoids 2, 3, co-operating with an armature 17 pivoted at 4. Connected in parallel with the coils 2, 3 are two relay coils 20, 20a. As the current which would pass through the photo cells when light was concentrated on them through the film might not be strong enough to operate the electromagnets referred to above, each photocell could be in an electrical circuit of its own (not shown in Fig. 1) leading through a resistance capacity coupling to the grid of a valve or system of valves and the electrical circuit of the above-named solenoids would pass from a high tension battery to the anode of each valve associated with the corresponding photocell. Thus when light falls on, say the photocell 15, a current will flow in the circuit of the photocell from its own electrical supply and this will cause a corresponding current to flow from the high tension battery to pass through the valve associated with photocell 15 and through the circuit shown in Figure 1 as passing through photocell 15. A similar arrangement would apply in connection with photocell 14. Thus when light falls alternately on the photo cells 14 and 15, alternate movements of the armature 17 would be caused by the circuit from the battery.

The armature 17 in turn co-acts with the fixed contacts 5, 6 connected in a circuit (not shown) including known means for moving the rudder of the torpedo to port or starboard according to whether the contact 5 or contact 6 is touched by the armature 17.

A sound-on-film recording is made, using the usual methods of sound film production, of the submarine sounds caused by a torpedo approaching under the water. A positive is made of the photographic film so that if a beam of light was projected through it, the series of light fluctuations caused would correspond with the sound impulses which had been used to make the film.

It is preferable to use the varying density method of recording of the sound track and to select a portion of the film where the sound is high pitched, that is, where the series of dark and light bands are close together. As only a short length of film is used, this is facilitated by the fact that the sound emitted by machinery is recurrent.

The chosen portion of film is made into an endless band by joining the ends together, care being taken that at the junction, the sound on film reproduction will not be thrown out of gear, so that when the film is placed in position on the sprockets shown in Figure 1 and made to revolve at an appropriate speed, a light concentrated on a minute portion of the film and passing through it will cause a continuous series of light fluctuations corresponding to the sound impulses which had been used to make the film.

Since the film has recorded thereon a record of the sound pattern emitted by the target to be attacked, light is able to pass through the film to actuate the photo cells 14, 15 if fluctuations thereof correspond with the recordings on the film, but light signals not synchronising with the sound fluctuations recorded on the film will be prevented from passing through the film; the sound track on the film thus acts as a light trap for light signals not synchronising with the sound record on the sound track.

The film 19 also passes through the gateway 16 and thus controls passage of light from the lamps 12, 13 to the cells 14, 15.

The film is carried on sprockets 6 one of which is driven by a chain 28 from a sprocket 29 and worm and worm wheel 21. This wheel 21 derives its power from a motor 18 operating through the clutch diagrammatically shown as comprising a clutch plate v, central rod w and expanded end x which rod passes freely through the wheel 21 and a clutch plate y affixed thereto. The wheel 21 is of the nature of an armature within the range of the electromagnets 20, 20a. When either of these magnets is energised it draws the wheel 21 towards its poles to release the clutch, against the action of springs 22 connected to a part in association with the clutch plate v which normally pull firmly against it, the clutch plate y thereby communicating the drive from the motor 18 through the chain 28 to the film 19.

The film 19 is made to revolve faster than necessary when the light fluctuations of the lamps 12, 13 are in synchronism with the sound track, this being effected by the motor 18.

The apparatus is adjusted in such a way that the light caused in the neon lamps when the torpedo has been discharged towards its target will be of sufficient strength to penetrate the light spaces of the variable density sound track on the average and to influence the photo cells in such a way that the current from the battery will cause the electromagnets to act efficiently, it being understood that there would necessarily be a certain amount of variation in the current released by the photo cells.

When the revolving film reaches the point when its markings correspond with the fluctuations of the lamps 12, 13, the increase of illumination from either or both of the lamps pass through the gate and through the film where it allows most light to pass. The electro-magnets 20, 20a cause the clutch plates v to slip and the speed of the wheel 21 slows down, causing the film to revolve slower. If the film speed becomes so slow that it slips out of synchronism with the light fluctuations, then the electromagnets 20, 20a cease to act and the clutch plates cause it to speed up.

The speed of the motor 18 and the strength of the springs 22 may be adjusted so as to ensure the correct amount of slipping of the clutch and maintenance of synchronisation of the film. Light thus impinging on the photo cells 14, 15 brings into operation the electromagnets 20, 20a.

The guiding mechanism operates as follows:

The intensity of light in the lamps 12 and 13 varies with the intensity of sound received by the respective microphones. If, say the microphone 7, is directly facing the target to be attacked, the intensity of light from lamp 12 which the film will allow to pass through to cell 14 will be at a maximum compared with that from lamp 13 to cell 15, which will be at a minimum since practically no sound from the target will be reaching the microphone 8. The current passing through cell 14 will therefore actuate the electromagnet 1 which will cause the armature 17 to swing into contact with 4 thus in turn causing the rudder to be moved to steer the torpedo to the right. The increasing sound in microphone 8 and the decreasing sound in microphone 7 will gradually check this movement, until the light from lamp 12 and lamp 13 had an equal action on cell 14 and cell 15 respectively and the torpedo will then be facing its target.

When the torpedo starts on its journey, the sound trap film 19, operated by motor working faster than would be necessary when fluctuations are synchronised, would reach a stage when its light transmission variations would for an instant exactly correspond with the series of incoming sound fluctuations and would permit light to pass through the film. At this stage more light would be passing through the film than under normal conditions and the light would be utilised to set the guiding mechanism in operation. Simultaneously the sound trap motor would be declutched and the revolving film would tend to slow down, finally arriving at its normal speed.

The microphones being disposed at the sides of the nose of the torpedo, a slight deviation of the torpedo will alter the amount of sound one microphone will receive compared with the other. With a large deviation, the nose of the torpedo itself would get in the track of the sound waves and cut them off from one microphone. The needle 17 would act like the control of a rudder, e. g., if it were deviated to the right the movement would alter the position of the rudder by any suitable mechanism so as to cause the torpedo to turn to the right and if deviated to the let the torpedo would turn to the left.

An arrangement of the character described above can thus control the direction of motion of the defense torpedo in such a way that it travels practically head-on to an oncoming selected hostile torpedo and may be caused to destroy, damage or deflect it.

Such an arrangement is particularly suitable for a torpedo running at a fixed level or one in which up or down movement was not required, but ordinarily, as is usual in torpedoes, the torpedo would be so made that it would travel freely up or down towards its objective and not at a fixed level.

The invention, though principally intended for use against hostile torpedoes may, by a suitable alteration of the sound trap, be used against other selected sound emitting objectives, e. g. hostile surface or submarine craft or a stationary hostile subaqueous object, provided sound the wave form of which is known is emitted thereby.

I claim:

1. A torpedo or other marine or submarine body or craft embodying at least two microphones disposed to be operated by sound vibrations approaching from different directions respectively, means for producing light rays corresponding in intensity with the intensity of the operation of said individual microphones, light actuated means co-acting with each of said light-producing means, a film having a sound track thereon corresponding with sound vibrations emitted by said target, said film being interposed between said light-producing means and said light-actuated means and means actuated by said latter means serving to control the direction of movement of said torpedo or craft.

2. A torpedo or other marine or submarine body or craft as claimed in claim 1 wherein said light-actuated means comprise photo-electric cells.

DANIEL MICHAEL O'DWYER.